United States Patent [19]

Meseth

[11] Patent Number: 5,754,609
[45] Date of Patent: May 19, 1998

[54] CONDENSATION VESSEL FOR THE MEASUREMENT OF STEAM PRESSURE, FILLING LEVEL AND STEAM FLOW RATE AND METHOD FOR OPERATING A CONDENSATION VESSEL

[75] Inventor: Johann Meseth, Dieburg, Germany

[73] Assignee: Siemens Aktiengesellschaft, Munich, Germany

[21] Appl. No.: 779,949

[22] Filed: Dec. 23, 1996

Related U.S. Application Data

[63] Continuation of PCT/DE95/00797 Jun. 20, 1995, published as WO95/35488 Dec. 28, 1995.

[30] Foreign Application Priority Data

Jun. 21, 1994 [DE] Germany .................. 44 21 273.9

[51] Int. Cl.⁶ .................................................. G21C 17/035
[52] U.S. Cl. ................. 376/247; 376/258; 73/299; 73/747; 165/111
[58] Field of Search ............................. 376/247, 258; 73/290 R, 291, 299, 700, 747; 165/111, 110

[56] References Cited

U.S. PATENT DOCUMENTS

| | | |
|---|---|---|
| 4,716,014 | 12/1987 | Cantineau ..................... 376/258 |
| 5,145,639 | 9/1992 | Hui ............................... 376/283 |
| 5,475,720 | 12/1995 | Oldenhage et al. .......... 376/258 |
| 5,566,571 | 10/1996 | Kasai et al. ................... 376/258 |

FOREIGN PATENT DOCUMENTS

| | | |
|---|---|---|
| 0226806 A1 | 7/1987 | European Pat. Off. . |
| 0334235 A1 | 9/1989 | European Pat. Off. . |
| 2306211 | 8/1974 | Germany . |
| 3938341 C1 | 7/1991 | Germany . |

*Primary Examiner*—Daniel D. Wasil
*Attorney, Agent, or Firm*—Herbert L. Lerner; Laurence A. Greenberg

[57] ABSTRACT

A condensation vessel for the measurement of steam pressure includes a steam zone, a steam line which opens in the steam zone at an entrance, a condensate zone which is directly adjacent the steam zone and geodetically below the entrance, and a discharge device which is connected to the steam zone and which serves for a discharge of steam and noncondensable gases from the condensation vessel. A method for operating the condensation vessel includes condensing steam which contains an increased fraction of a noncondensable gas, in particular radiolysis gas, out of the steam zone. The gas is led out of the condensation vessel in dissolved form through the discharge device, with the result that the risk of faulty measurement is largely ruled out, since virtually no gas is dissolved in the condensate within the condensate zone. The condensation vessel can be installed in a simple way, even in the course of retrofitting, for measuring the filling level of a reactor pressure vessel.

19 Claims, 5 Drawing Sheets

CONDENSATION VESSEL FOR THE MEASUREMENT OF STEAM PRESSURE, FILLING LEVEL AND STEAM FLOW RATE AND METHOD FOR OPERATING A CONDENSATION VESSEL

CROSS-REFERENCE TO RELATED APPLICATION

This application is a Continuation of International Application Ser. No. PCT/DE95/00797, filed Jun. 20, 1995, published as WO95/35488 Dec. 28, 1995.

BACKGROUND OF THE INVENTION

Field of the Invention

The invention relates to a condensation vessel for measuring steam pressure, for measuring a filling level of a reactor pressure vessel and for measuring a flow rate of fresh steam in a nuclear power plant, and a method for operation of the condensation vessel.

German Published, Non-Prosecuted Patent Application 2 306 211describes a sampling device for radioactive or aggressive liquid and vaporous media. The sampling device has a main line, from which a tap line branches off and is lead to a sampling board. A tap point and at least one meter are provided on the sampling board and a return line is provided from the sampling board to the condenser. At least one tap stage which is provided between the tap line and the return line has quick-fastening couplings in the direction of both lines for connecting a sampling container or a meter and is bridged by a bypass line. The sampling device serves the purpose of taking samples from a closed system, in order to increase safety against the outflow of radioactive water.

German Patent DE 39 38 341 C1 relates to a heat treatment device for reliably and effectively subjecting a product, to be treated at a relatively low temperature, for example less than 100° C., to heat treatment through the use of steam and/or water of reduced pressure as a heat medium. In that case, the device is provided to ensure improved heat treatment through the use of steam of reduced pressure, wherein a uniform steam pressure in the heat exchanger chamber and high thermal efficiency are afforded. The device may be used in the chemical industry and the food industry.

A condensation vessel which is constantly filled with condensate to a predetermined height over time is used, for example, for determining a filling level of a pressure vessel of a boiling water reactor. In that case, the steam pressure prevailing in the condensation vessel and the hydrostatic pressure generated through the largely constant quantity of condensate, in combination with the steam pressure inside the pressure vessel, give information on the filling level in the pressure vessel. The condensation vessel is constantly connected to the pressure vessel, so that in addition to steam, under some circumstances radiolysis gas and other noncondensable gases, in particular nitrogen, are fed to the condensation vessel. Those gases lead to a drop in the partial pressure of the steam and consequently to a variation in the thermodynamic conditions in the condensation vessel. Moreover, the gases are dissolved in the condensate, with the result that a gas-saturated condensate is obtained. In the event of a drop in the steam pressure, the gases dissolved in the condensate, by escaping from the condensate, may lead to a reduction in the condensate volume and consequently to a faulty measurement of the filling level.

Even when a steam flow rate is measured through the use of a Venturi tube, in which a condensation vessel is used in each case for determining necessary pressures, there is likewise the possibility of faulty pressure measurement if there is an accumulation of relatively large quantities of a noncondensable gas in the condensation vessel.

Faulty measurements in determining the filling level of a pressure vessel of a boiling water reactor became known in boiling water reactors in the USA. In order to avoid such faulty measurement, additional actively operated systems have heretofore been installed. Such systems bring about a continuous controlled feed of condensate which is free of dissolved noncondensable gas. The condensate is thereby effectively depleted of noncondensable gases, and a diffusion process is set in motion, in which noncondensable gases from the steam zone infiltrates into the condensate, thereby reducing the concentration of noncondensable gases in the steam space. In addition to an increased outlay in terms of apparatus and a corresponding monitoring of the system, such a system must always ensure that sufficiently gas-free condensate occurs.

SUMMARY OF THE INVENTION

It is accordingly an object of the invention to provide a condensation vessel for the measurement of steam pressure, filling level and steam flow rate and a method for operating a condensation vessel, which overcome the hereinafore-mentioned disadvantages of the heretofore-known devices and methods of this general type and in which an accumulation of noncondensable gas is reliably avoided in a more efficient way.

With the foregoing and other objects in view there is provided, in accordance with the invention, a condensation vessel for the measurement of steam pressure, comprising an entrance; a steam zone; a steam line opening into the steam zone at the entrance; a condensate zone adjacent the steam zone and geodetically directly below the entrance; and a discharge device connected to the steam zone for a discharge of steam and noncondensable gases from the condensation vessel.

According to the invention, it is guaranteed that a noncondensable gas, which is introduced into the steam zone through a steam line, is led out of the condensation vessel again through the discharge device. This separately acting discharge ensures that an accumulation of noncondensable gas in the condensation vessel is avoided. In particular, it prevents an appreciable fraction of noncondensable gas from dissolving in the condensate zone and thereby possibly leading to a faulty measurement of the steam pressure. A separate discharge of noncondensable gas through the use of a discharge device is advantageous, since a noncondensable gas which is lighter than steam cannot for the most part be discharged from the condensation vessel through the steam line. This applies both to a steam line running horizontally and a steam line ascending towards the entrance of the condensation vessel. In particular, this is because although condensate leaves the condensation vessel again as a thin condensate film along the steam line, this condensate flowing back nevertheless contains virtually no dissolved gas. This is because noncondensed gas that is possibly dissolved in the condensate film escapes as gas and, together with the steam, is led almost exclusively in the direction of the condensation vessel. A return transport of noncondensable gas out of the condensation vessel by transport either in steam or in condensate is virtually excluded. For example, a mixture of steam and radiolysis gas has lower specific gravity than pure steam, in particular due to a fraction of hydrogen. The specific gravity of the mixture decreases with rising temperature and assumes a minimum at around 200° C. An increase in the concentration of radiolysis gas causes such a mixture to rise and consequently dissolving in the condensate film is largely ruled out. It is possible to ensure passively that an accumulation of noncondensable gas in the condensation vessel is effectively avoided, through the use of the separate discharge of the noncondensable gas. Consequently, virtually no gas is dissolved in the condensate zone either, with the result that, even in the event of a pronounced pressure drop, a release of gas bubbles is largely ruled out. Faulty measurement of the filling level is therefore effectively prevented. The discharge device can also be operated actively, for example by the provision of a pump which sucks off steam and noncondensable gases or additional condensate, in which noncondensable gases are dissolved, out of the condensation vessel through a pumping line.

In accordance with another feature of the invention, the discharge device is connected to the geodetically upper end of the steam zone. The advantage of this is that a noncondensable gas, for example radiolysis gas which has lower specific gravity than steam and which rises predominantly in the upper end of the steam zone and could accumulate there, can be led out of the condensation vessel directly from this accumulation point. An accumulation of a relatively large quantity of noncondensable gas in the condensation vessel is thereby prevented from the outset.

In accordance with a further feature of the invention, the condensation vessel has a partition through the use of which the steam zone is divided into a first steam part zone and a second steam part zone. The division is carried out, in this case, in such a way that steam of the first steam part zone condenses into the condensate zone and steam of the second steam part zone passes into the discharge device, in particular condenses there. By virtue of such a division of the steam zone, the condensation vessel can be constructed particularly compactly and further lines, through the use of which the noncondensable gas is lead out of the condensation vessel, can be dispensed with. Such a condensation vessel is also particularly suitable for replacing existing condensation vessels, while requiring the same amount of space.

In accordance with an added feature of the invention, approximately 20 to 50% of the condensate precipitating from the steam zone can be condensed through the discharge device, in particular in an additional condensate zone. Even under unfavorable conditions, in particular when a large quantity of noncondensable gas is being supplied, it is thereby ensured that this is removed from the condensation vessel again essentially in full.

In accordance with an additional feature of the invention, the discharge device has a U-line, in particular a siphon. When the condensation vessel is put into operation, this U-line fills with additional condensate, so that steam present in the steam zone does not pass directly into the condensate discharge line. This results in the noncondensable gas being transported solely in dissolved form through the condensate discharge line. The U-line, a cooling stage and an additional condensate zone can either be disposed outside a housing, in which the condensate zone and the steam zone are located, or, for example to protect such a housing against mechanical damage, they could be coiled around the latter or integrated in the housing. The housing can have its longest extent in the vertical direction (upright version) or in the horizontal direction (reclining version).

In accordance with yet another feature of the invention, the discharge device has an additional condensate zone, in which steam condenses out of the steam region as an additional condensate. This additional condensate, which is spatially separated from the condensate of the condensate zone, may contain an increased fraction of noncondensable gas. This noncondensable gas can be returned separately, together with the additional condensate, into a steam vessel. A separate return of the additional condensate largely rules out an escape of dissolved noncondensable gas. This is therefore reliably led out of the condensation vessel together with the additional condensate. The additional condensate zone included in the discharge device can be disposed both inside and outside the condensation vessel. The additional condensate zone has a condensate discharge line, through the use of which the additional condensate is returned into the steam vessel or is guided into a separate dewatering system. In either case, a noncondensable gas is thereby guided out of the condensation vessel and an accumulation of relatively large quantities of noncondensable gases in the condensation vessel is effectively prevented.

In accordance with yet a further feature of the invention, the additional condensate zone has a cooling stage in which condensation is assisted. In the additional condensate occurring in the cooling stage, a noncondensable gas can be dissolved to a high degree and be removed from the condensation vessel effectively through the condensate discharge line.

In accordance with an added feature of the invention, the cooling stage commences at the geodetically upper end of the steam zone, into which end a noncondensable gas rises.

In accordance with an additional feature of the invention, the U-line is placed both outside the condensate zone and outside the steam zone, depending on local circumstances and on the geometry of the condensation vessel to be used.

In accordance with yet another feature of the invention, in order to provide a more rapid formation of condensate in the additional condensate zone, at least part of the additional condensate zone is located in the condensate zone and/or in the steam zone of the condensation vessel. It is also advantageous, where appropriate for space saving reasons or for protection against mechanical damage, if the additional condensate zone runs inside the condensation vessel.

In accordance with yet a further feature of the invention, the condensate discharge line is lead predominantly inside the steam line, with the result that additional space is not taken up nor is it necessary to provide an additional inlet orifice for the condensate discharge line into a corresponding condensate reception system. This condensate reception system can, in this case, be a steam vessel, for example a reactor pressure vessel of a nuclear power plant, or a steam-carrying line, to which the steam line is connected.

In accordance with yet an added feature of the invention, the condensation vessel is disposed on a reactor pressure vessel of a nuclear power plant, in particular a boiling water reactor, with the steam line opening into the reactor pressure vessel at a pressure vessel mouth, and the discharge device returning into the reactor pressure vessel, in particular through the use of a condensate discharge line. In this way, a noncondensable gas, in particular radiolysis gas with hydrogen and/or oxygen, which occurs in the reactor pressure vessel, is returned into the reactor pressure vessel directly again, without exerting any influence on the measurement of steam pressure within the condensation vessel. Likewise, the condensation vessel can be disposed on a steam-carrying line of the nuclear power plant and the condensate discharge line can return into this steam-carrying line. Moreover, the condensation vessel can be connected to a pressure holding device of a pressurized water reactor. Preferably, the condensate discharge line of the discharge device projects into the reactor pressure vessel and has a siphon within the reactor pressure vessel. According to a further preference, the lowest point of the siphon is located geodetically below a pressure vessel mouth, through which the condensate discharge line is introduced into the reactor pressure vessel.

In accordance with yet an additional feature of the invention, there is provided a U-line of the discharge device having a geodetically lowest point which is geodetically lower than the pressure vessel mouth. This reduces the possibility that the U-line will be emptied of an additional condensate occurring in the discharge device.

In accordance with again another feature of the invention, the discharge device, in particular a condensate discharge line, leads into a dewatering system of a nuclear power plant.

In accordance with again a further feature of the invention, the condensation vessel is used for determining the filling level of cooling water of a reactor pressure vessel, in particular of a boiling water reactor. Since the condensation vessel ensures that the condensate zone is constantly filled with condensate to the predetermined height, faulty determination of the filling level, in particular due to non-condensable gases escaping as gas from the condensate, is largely ruled out.

In accordance with again an added feature of the invention, the condensation vessel can also be used for measuring the flow rate of fresh steam in a fresh steam line of a nuclear power plant, in particular of a boiling water reactor. In this case, the condensation vessel can be used, for example, for measuring the steam pressure in a Venturi tube, without the risk of faulty measurement due to released noncondensable gases dissolved in the condensate. Since an accumulation of gases, in particular chemically reactive gases, inside the condensation vessel is likewise avoided, pressure measurement can be carried out through the use of sensitive pressure transducers. It is not necessary to use pressure transducers with a high permissible static pressure, for example of about 250 bar or more, but with low measuring sensitivity, since a chemical gas reaction in the condensation vessel, which could lead to high pressure peaks, is virtually ruled out. The condensation vessel therefore also ensures reliable and accurate flow rate measurement.

With the objects of the invention in view there is also provided a method for measuring steam pressure with a condensation vessel having a steam zone, a steam line opening into the steam zone at an entrance, and a condensate zone directly adjacent the steam zone and geodetically below the entrance, the method which comprises discharging steam and noncondensable gases from the steam zone.

The steam is preferably discharged in an upper end of the condensation vessel, since noncondensable gases of low specific density rise there. These are thereby removed from the condensation vessel particularly effectively, so that faulty measurements as a result of noncondensable gases dissolved in the condensate zone can largely be ruled out. In this case, the steam can be discharged from the condensation vessel passively, in particular through an additional condensate zone, or actively, for example through a pump.

Other features which are considered as characteristic for the invention are set forth in the appended claims.

Although the invention is illustrated and described herein as embodied in a condensation vessel for the measurement of steam pressure, filling level and steam flow rate and a method for operating a condensation vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
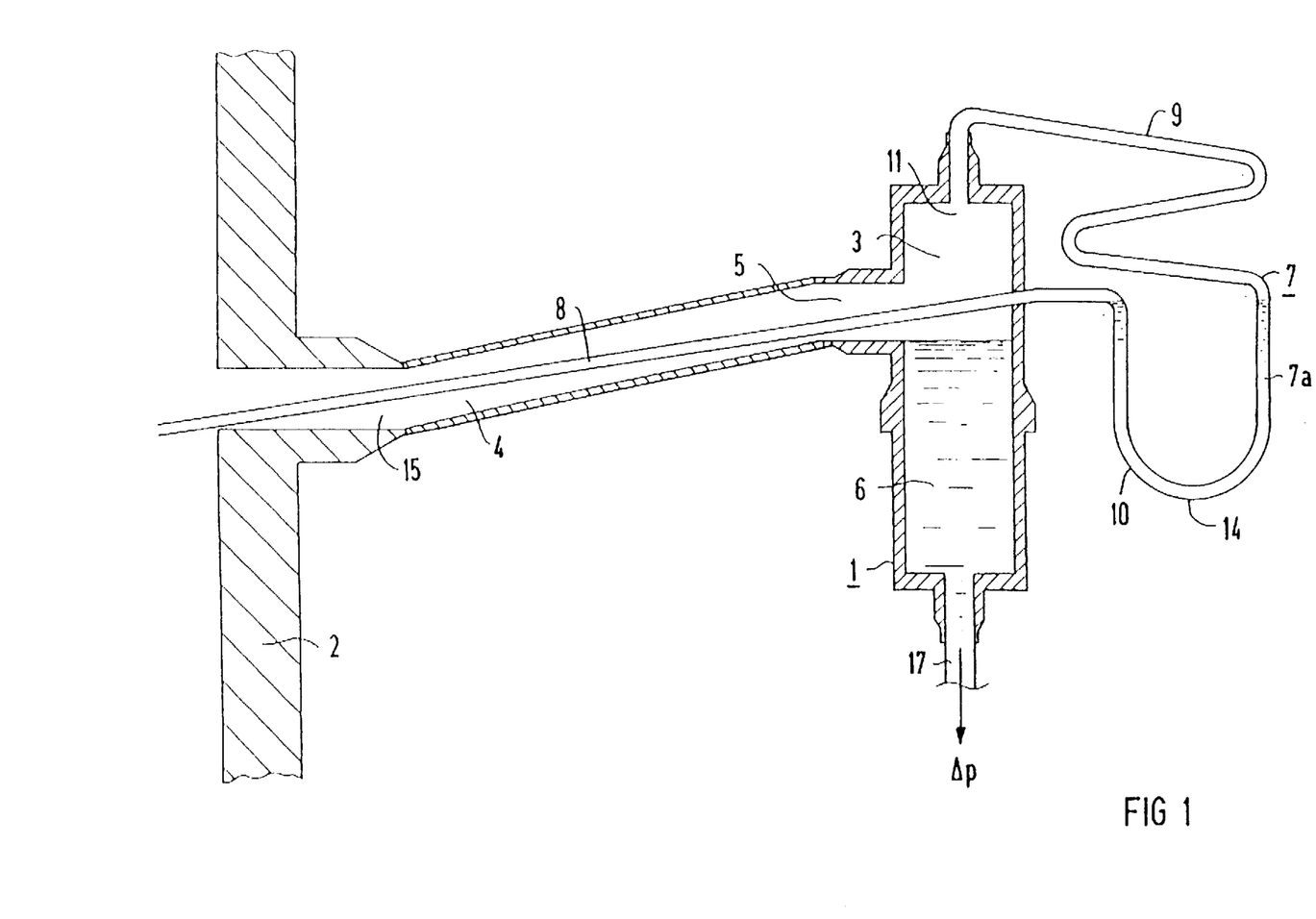
FIG. 1 is a fragmentary, diagrammatic, longitudinal-sectional view of a first embodiment of a condensation vessel.

Referring now in detail to the figures of the drawings, each of which shows only components that are essential for an explanation of the invention and first, particularly, to FIG. 1 thereof, there is seen a condensation vessel 1 which is connected through a steam line 4 to a reactor pressure vessel 2. The condensation vessel 1 can also be connected to components which include, but are not limited to, a steam-carrying line, in particular a fresh steam line of a boiling water reactor or a pressure holding device of a pressurized water reactor. The steam line 4 of the condensation vessel 1 opens into the reactor pressure vessel 2 at a pressure vessel mouth 15. The steam line 4 is connected to the condensation vessel 1 through an entrance 5. The steam line 4 runs in an ascending gradient from the pressure vessel mouth 15 to the entrance 5 of the condensation vessel 1. Within the condensation vessel 1, a condensate zone 6 is directly adjacent and geodetically below the entrance 5. The condensate zone 6 is constantly filled with condensate up to the height of the entrance 5. Newly occurring condensate thus flows directly back into the reactor pressure vessel 2 through the steam line 4. A steam zone 3 is adjacent and geodetically above the condensate zone 6. Steam constantly flows into this steam zone 3 from the reactor pressure vessel 2 through the steam line 4. The pressure within the steam zone 3 corresponds essentially to the pressure within the reactor pressure vessel 2. The steam zone 3 is connected to a differential pressure transducer 20 which serves for measuring the filling level, through a differential pressure measuring line 17 which is adjacent to and geodetically below the condensate zone 6. A discharge device 7 of the condensation vessel 1 has an additional condensate zone 7a and commences at a geodetically upper end 11 of the steam zone 3. Directly adjacent the upper end 11 is a cooling stage 9, adjacent which is a U-line 10, a siphon, that merges into a condensate discharge line 8. The condensate discharge line 8 passes through the condensation vessel 1 above the condensate zone 6 and runs, in the steam line 4, from the entrance 5 of the condensation vessel into the reactor pressure vessel 2. The U-line 10 is filled with additional condensate to such an extent that some of this additional condensate constantly flows back into the reactor pressure vessel 2 through the condensate discharge line 8. The additional condensate collected in the U-line 10 contains, in dissolved form, a noncondensable gas which has entered the condensation vessel 1 through the steam line 4 from the reactor pressure vessel 2 together with steam. This gas, due to its low density, rises into the geodetically upper end 11 of the steam zone 3, from where it passes together with condensing steam into the U-line 10. Thus, immediately after entering the condensation vessel 1, the noncondensable gas is led out of the condensation vessel 1 again through the additional condensate zone 7a in a passive way and is fed back in dissolved form into the reactor pressure vessel 2. Furthermore, the noncondensable gas at the pressure vessel mouth 15, which is fed back in dissolved form, is not once again fed into the condensation vessel 1 together with steam. An accumulation of noncondensable gas in the condensation vessel 1 can also thereby be additionally reduced. Due to the direct gas discharge, the condensate which is present in the condensate zone 6 at most has an insignificant fraction of dissolved noncondensable gas. Faulty measurement of the filling level of the reactor pressure vessel 2 due to a release of gas and an associated displacement of the condensate in the differential pressure measuring line 17 can thereby be reliably avoided. Since the condensate discharge line 8 runs inside the steam line 4, an additional leadthrough into the reactor pressure vessel 2 is not necessary nor is there an additional space requirement, so that a retrofitting of existing condensation vessels 1 is particularly simple.

Figure 2:
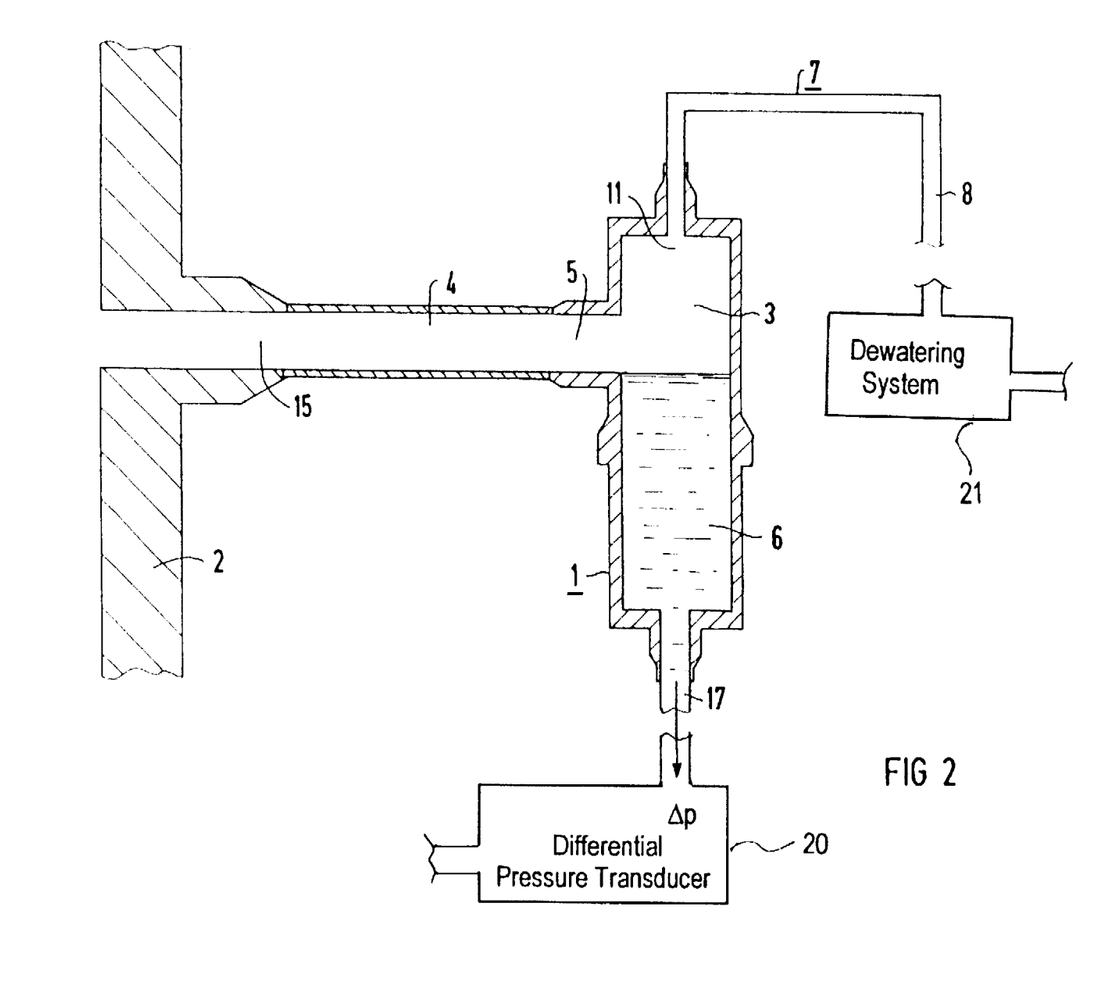
FIG. 2 is a fragmentary, longitudinal-sectional view of a second embodiment of the condensation vessel.

FIG. 2 shows a second embodiment of a condensation vessel 1. The reference symbols therein correspond to those of FIG. 1. In this case, the steam line 4 runs horizontally between the entrance 5 of the condensation vessel 1 and the pressure vessel mouth 15 into the reactor pressure vessel 2, thereby likewise ensuring that additional condensate occurring in the steam space 3 returns into the reactor pressure vessel 2 through the steam line 4. The height of the condensate in the condensate zone 6 is thereby always kept constant. The condensate discharge line 8 leads to a dewatering system 21 of the nuclear power plant. In this way, a noncondensable gas dissolved in the additional condensate is capable of being removed in a simple way in the dewatering system. The fraction of noncondensable gas, in particular radiolysis gas, within the condensation vessel 1 is thereby reduced effectively.

Figure 3:
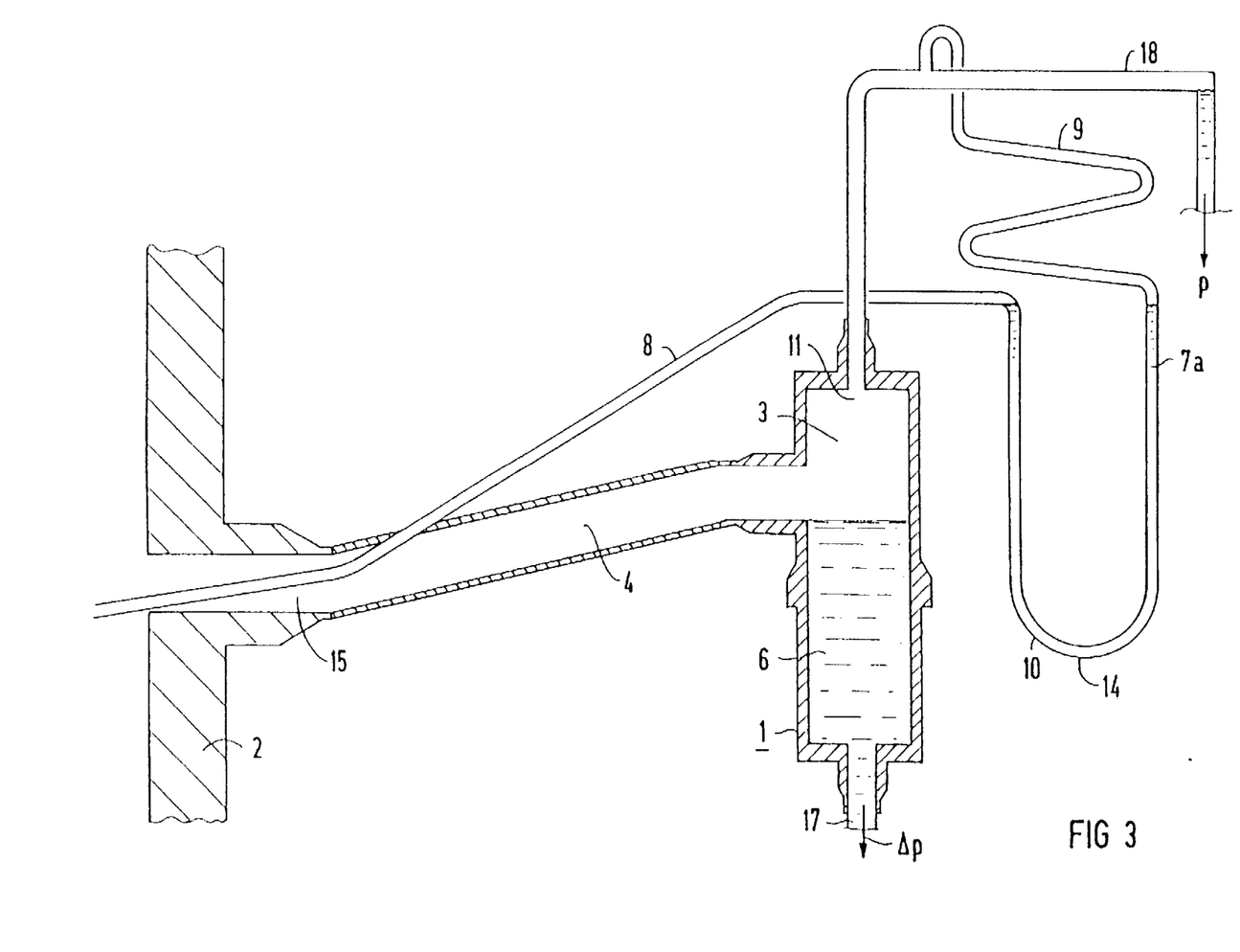
FIG. 3 is a fragmentary, longitudinal-sectional view of a third embodiment of the condensation vessel.

In the third embodiment of the condensation vessel 1 shown in FIG. 3, an additional condensate zone 7a is connected to the steam zone 3 through an absolute pressure measuring line 18. A steam-filled part of the absolute pressure measuring line 18 is included in the steam zone 3. In this case, the entire additional condensate zone 7a with the cooling stage 9, the U-line 10 and the condensate discharge line 8, is located outside the condensation vessel 1. The condensate discharge line 8 opens into the steam line 4 in the vicinity of the pressure vessel mouth 15. Therefore, in this third embodiment there is no need for an additional leadthrough either into the condensation vessel 1 or into the reactor pressure vessel 2. Retrofitting of an already existing condensation vessel 1 is consequently possible in a particularly simple way.

Figure 4:
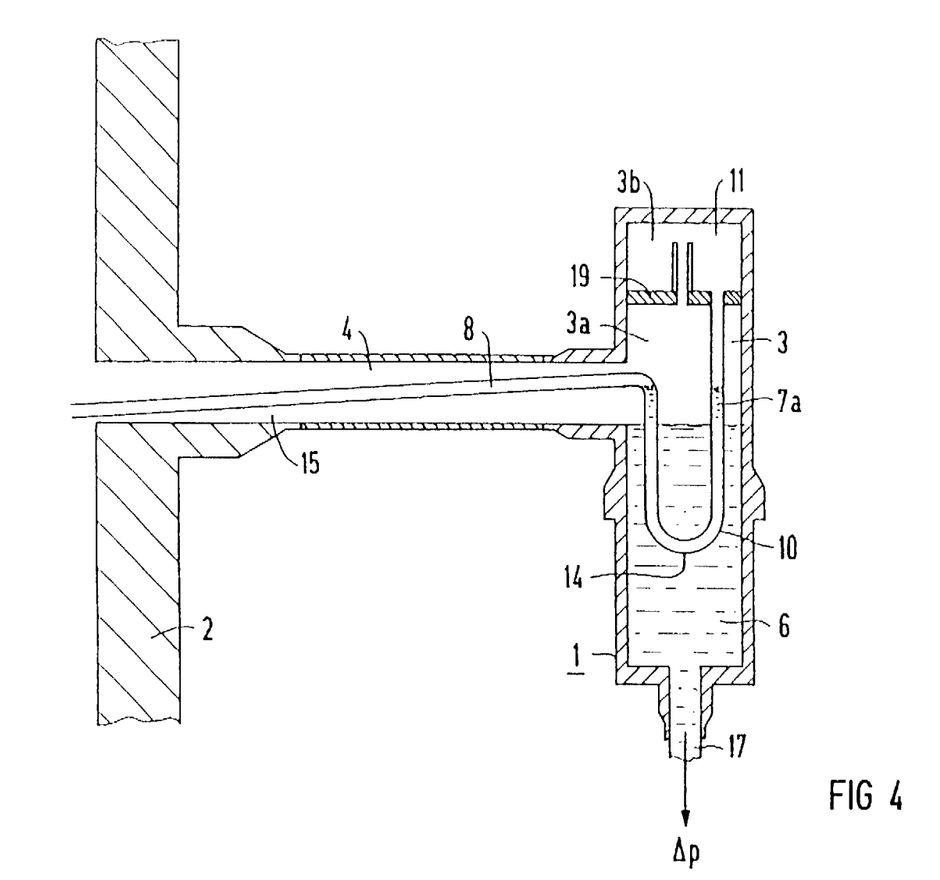
FIG. 4 is a fragmentary, longitudinal-sectional view of a fourth embodiment of the condensation vessel.

FIG. 4 shows a condensation vessel 1 with an additional condensate zone 7a, with a U-line 10 and with a condensate discharge line 8. The steam zone 3 is divided by a partition 19 into a first steam part zone 3a and a second steam part zone 3b. The partition 19 is disposed horizontally and is opened for a passage of steam out of the first steam part zone 3a into the second steam part zone 3b. The partition 19, which in particular is a separating plate, can be both curved or planar and can be disposed obliquely, conically or vertically. The U-line 10 which is connected to the partition 19 is disposed completely inside the condensation vessel 1 and is opened to the second steam part zone 3b. A geodetically lowest point 14 of the U-line 10 is located in the condensate zone 6 and is disposed lower than the pressure vessel mouth 15. This both ensures additional cooling in the additional condensate zone 7a and reduces the possibility of emptying of the U-line 10. Furthermore, there is no need for an additional leadthrough either through the condensation vessel 1, the steam line 4 or the reactor pressure vessel 2.

Figure 5:
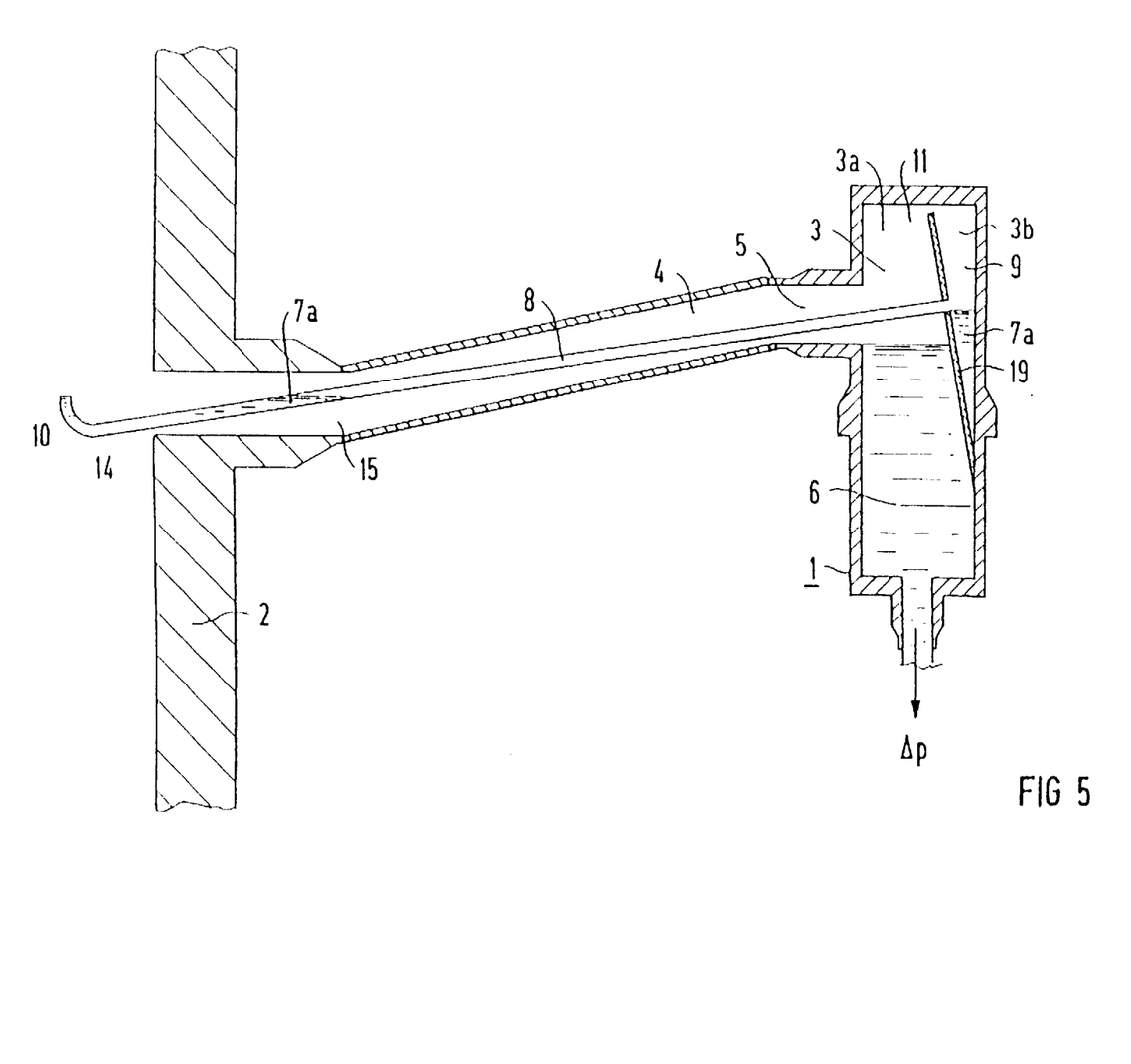
FIG. 5 is a fragmentary, longitudinal-sectional view of a fifth embodiment of the condensation vessel.

FIG. 5 is a longitudinal section which shows a fifth embodiment of a condensation vessel 1 that is connected to a reactor pressure vessel 2 through an ascending steam line 4, in a way similar to FIG. 1. The reference symbols are identical to those of FIG. 1. The steam space 3 of the condensation vessel 1 is divided by an oblique partition 19 into a first steam part zone 3a and a second steam part zone 3b. The first steam part zone 3a faces the steam line 4 and is connected thereto through the entrance 5 of the condensation vessel 1 for the exchange of steam. The second steam part zone 3b faces away from the steam line 4 and is opened to the first steam part zone 3a at the geodetically upper end 11 of the steam zone 3. The condensate discharge line 8 which is led through the steam line 4, on one hand opens through the separating plate 19 into the second steam part zone 3b, and on the other hand opens into the reactor pressure vessel 2. The second steam part zone 3b at the same time serves as a cooling stage 9 for the condensation of an additional condensate which condenses out directly below the second steam part zone 3b in the additional condensate zone 7a. The level of the additional condensate within the additional condensate zone 7a is so high that additional condensate can flow into the condensate discharge line 8 and pass therethrough into the reactor pressure vessel 2. Inside the reactor pressure vessel 2, the condensate discharge line 8 has a U-line 10, a siphon, with a lowest point 14 which is likewise located inside the reactor pressure vessel 2. The U-line 10 forms a further additional condensate zone 7a, into which the additional condensate passes out of the condensation vessel 1 into the condensate discharge line 8. The geodetically lowest point 14 of the U-line 10 is located approximately level with the pressure vessel mouth 15.

The condensation vessel according to the invention, with a discharge device, in particular with an additional condensate zone and a condensate discharge line, is distinguished in that it acts passively to prevent an accumulation of a noncondensable gas within the condensation vessel. The quantity of dissolved noncondensable gas in the condensate, which is provided for measuring the steam pressure within the condensation vessel, is thereby likewise kept so small that faulty measurement as a result of a release of relatively large quantities of gas, is ruled out. The condensation vessel is therefore suitable for measuring the filling level of a nuclear reactor pressure vessel, in particular of a boiling water reactor, and for measuring the steam flow rate in a steam-carrying line, in particular a fresh steam line of a boiling water reactor, through the use of a Venturi tube.

I claim:

1. A condensation vessel for the measurement of steam pressure, comprising:

an entrance;

a steam zone;

a steam line opening into said steam zone at said entrance;

a condensate zone directly adjacent said steam zone and geodetically below said entrance; and a discharge device connected to said steam zone for a discharge of steam and noncondensable gases from the condensation vessel, said discharge device having a U-line and said U-line being a siphon.

2. The condensation vessel according to claim 1, wherein said steam zone has a geodetically upper end to which said discharge device is connected.

3. The condensation vessel according to claim 1, including a partition dividing said steam zone into a first steam part zone from which steam condenses into said condensate zone, and a second steam part zone from which steam passes into said discharge device for condensing there.

4. The condensation vessel according to claim 1, wherein said discharge device condenses approximately 20% to 50% of condensate occurring from said steam zone.

5. The condensation vessel according to claim 1, wherein said U-line is located outside said condensate zone and outside said steam zone.

6. The condensation vessel according to claim 1, wherein said discharge device has an additional condensate zone with a condensate discharge line.

7. The condensation vessel according to claim 6, wherein said steam zone has a geodetically upper end at which a cooling stage commences.

8. The condensation vessel according to claim 6, wherein said condensate discharge line is led predominantly within said steam line.

9. The condensation vessel according to claim 1, including a connection of said steam line into a pressure vessel mouth of a reactor pressure vessel of a nuclear power plant, and said discharge device returns into the reactor pressure vessel.

10. The condensation vessel according to claim 9, including a condensate discharge line connected between said discharge device and the reactor pressure vessel.

11. The condensation vessel according to claim 9, wherein said U-line has a geodetically lowest point geodetically lower than the pressure vessel mouth.

12. The condensation vessel according to claim 9, wherein said discharge device has a condensate discharge line projecting into the reactor pressure vessel.

13. The condensation vessel according to claim 1, including a dewatering system connected to said discharge device and wherein said steam line opens into a pressure vessel mouth of a reactor pressure vessel of a nuclear power plant.

14. The condensation vessel according to claim 13, including a condensate discharge line connected between said discharge device and the dewatering system.

15. The condensation vessel according to claim 1, including a differential pressure transducer for determining a filling level of cooling water of a reactor pressure vessel, with the condensation vessel.

16. A condensation vessel for the measurement of steam pressure, comprising:

an entrance;

a steam zone;

a steam line opening into said steam zone at said entrance;

a condensate zone directly adjacent said steam zone and geodetically below said entrance;

a discharge device connected to said steam zone for a discharge of steam and noncondensable gases from the condensation vessel, said discharge device having an additional condensate zone with a condensate discharge line; and said additional condensate zone also having a cooling stage.

17. A condensation vessel for the measurement of steam pressure, comprising:

an entrance;

a steam zone;

a steam line opening into said steam zone at said entrance;

a condensate zone directly adjacent said steam zone and geodetically below said entrance;

a discharge device connected to said steam zone for a discharge of steam and noncondensable gases from the condensation vessel, said discharge device having an additional condensate zone with a condensate discharge line; and said additional condensate zone located at least partially in at least one of said steam zone and said condensate zone.

18. A condensation vessel for the measurement of steam pressure, comprising:

an entrance;

a steam zone;

a steam line opening into said steam zone at said entrance;

a condensate zone directly adjacent said steam zone and geodetically below said entrance;

a discharge device connected to said steam zone for a discharge of steam and noncondensable gases from the condensation vessel; and a partition dividing said steam zone into a first lower steam part zone from which steam condenses into said condensate zone, and a second upper steam part zone from which steam and non-condensable gases pass into said discharge device for condensing there.

19. A method for operating a condensation vessel, which comprises:

providing a condensation vessel having a steam zone and a condensation zone, providing a reactor pressure vessel having a pressure vessel mouth, providing a differential pressure transducer and a discharge device having a U-line shaped siphon;

connecting the steam zone of the condensation vessel to the pressure vessel mouth of the reactor pressure vessel;

connecting the condensation zone of the condensation vessel to the differential pressure transducer;

connecting a geodetically upper end of the steam zone to the U-line shaped siphon of the discharge device;

discharging steam and noncondensable gases from the steam zone to the U-lined shaped siphon; and determining a filling level of cooling water of the reactor pressure vessel.

* * * * *